United States Patent
Azzam (10) Patent No.: US 10,527,477 B2
(45) Date of Patent: Jan. 7, 2020

(54) REMOTE MONITORING OF FUEL CONSUMPTION WITH REPEATED FUEL CONSUMPTION MEASUREMENTS STORED IN A REMOVABLE MEMORY DEVICE

(71) Applicant: Azzam Azzam, Majdal Shams (IL)

(72) Inventor: Azzam Azzam, Majdal Shams (IL)

( * ) Notice: Subject to any disclaimer, the term of this patent is extended or adjusted under 35 U.S.C. 154(b) by 138 days.

(21) Appl. No.: 15/890,642

(22) Filed: Feb. 7, 2018

(65) Prior Publication Data

US 2018/0224312 A1 Aug. 9, 2018

(30) Foreign Application Priority Data

Feb. 7, 2017 (IL) .......................................... 250492

(51) Int. Cl.
| | |
|---|---|
| *G01M 17/00* | (2006.01) |
| *G01F 9/00* | (2006.01) |
| *G06Q 30/02* | (2012.01) |
| *G01F 23/296* | (2006.01) |
| *G01F 1/00* | (2006.01) |

(52) U.S. Cl.
CPC ............ *G01F 9/006* (2013.01); *G01F 23/296* (2013.01); *G06Q 30/0234* (2013.01); *G01F 1/007* (2013.01); *G01F 9/00* (2013.01)

(58) Field of Classification Search
USPC .............................. 73/114.52, 114.53, 114.54
See application file for complete search history.

(56) References Cited

U.S. PATENT DOCUMENTS

| | | | |
|---|---|---|---|
| 5,251,482 A | 10/1993 | Bates et al. | |
| 6,925,869 B2 | 8/2005 | Senibi et al. | |
| 7,287,425 B2 | 10/2007 | Lagergren | |
| 7,865,317 B2 | 1/2011 | Begin | |
| 8,201,446 B2 | 6/2012 | Kingdon | |
| 8,583,387 B2 | 11/2013 | Murphy | |
| 9,026,306 B2 | 5/2015 | Wu et al. | |
| 9,043,073 B2 | 5/2015 | Ricci | |
| 9,043,402 B2 | 5/2015 | Fosburgh | |
| 9,047,721 B1 | 6/2015 | Botnen | |
| 9,103,687 B1* | 8/2015 | Loo ................... | G01C 21/3469 |
| 2010/0262333 A1* | 10/2010 | Storgaard ............... | G07C 5/008 701/31.4 |
| 2010/0274440 A1* | 10/2010 | Kim ....................... | G07C 5/008 701/31.4 |
| 2012/0203449 A1* | 8/2012 | Sengoku ................ | G07C 5/008 701/123 |
| 2014/0214312 A1* | 7/2014 | Yoshizu ................... | G01F 9/00 701/123 |
| 2015/0183439 A1* | 7/2015 | Jackson ............. | G01C 21/3469 701/123 |
| 2016/0131069 A1* | 5/2016 | Wackerle ............ | F02D 41/2429 701/115 |

(Continued)

FOREIGN PATENT DOCUMENTS

JP H09166478 6/1997

*Primary Examiner* — Eric S. McCall
(74) *Attorney, Agent, or Firm* — IPAttitude Ltd.; S. Yarus (57) ABSTRACT

A method of reporting fuel consumption, the method comprising: providing a vehicle having a fuel level monitor; repeatedly measuring fuel consumption by the vehicle with the monitor; providing a server operable to generate fuel consumption reports, and transmitting the fuel consumption measurements via a communication channel between the fuel level monitor and the server.

16 Claims, 2 Drawing Sheets

(56) References Cited

U.S. PATENT DOCUMENTS

| | | |
|---|---|---|
| 2016/0212939 A1* | 7/2016 | Ouchida .............. A01D 41/127 |
| 2016/0284215 A1* | 9/2016 | Ova ................. G08G 1/096716 |
| 2017/0103589 A1* | 4/2017 | Makke ................... B60K 35/00 |
| 2017/0146362 A1* | 5/2017 | Bai .................... G01C 21/3469 |
| 2018/0144415 A1* | 5/2018 | Rahmoun .............. G06Q 50/06 |

* cited by examiner

REMOTE MONITORING OF FUEL CONSUMPTION WITH REPEATED FUEL CONSUMPTION MEASUREMENTS STORED IN A REMOVABLE MEMORY DEVICE

TECHNICAL FIELD

Embodiments relate to monitoring fuel consumption, in particular the monitoring of fuel consumption of vehicles from on-board fuel tanks. Still more particularly embodiments relate to the monitoring and reporting fuel consumption in excise movement and control systems.

BACKGROUND

Gasoline (or petrol), as well as diesel fuel and other fuels, have excise tax imposed on them in various jurisdictions including countries such as Australia, Israel, New Zealand and the United States. This excise tax is sometimes used to raise funds to support transportation infrastructure and the cost of cleaning the environment from pollution caused by consumption of the fuel. Some users of the fuel may receive tax refunds for providing a report of fuel usage. Accordingly, employers and owners of company vehicle fleets may need continuous reporting of the fuel usage of the vehicle fleet for accounting purposes as well as to monitor the proper use and/or condition of the vehicles.

Tracking fuel consumption of a vehicle by measuring the amounts of fuel that are dispensed at filling stations is a common practice. Fuel dispensers at the stations are equipped with meters to measure the dispensed fuel. The dispensers commonly require the vehicle's driver to provide identification means related to the vehicle and/or driver, and to provide documentation of fuel refilling amounts that essentially correspond to fuel usage by the vehicle. However, monitoring only at filling stations does not provide any data between fillings during which some fuel may be stolen or otherwise fraudulently withdrawn.

Furthermore, in some situations station-based monitoring may not be applicable, for example when a vehicle is used in a remote location, such as a tractor in a large field or building site, where taking the vehicle to a filling station is not practicable. In such contexts, a large fuel tank may be provided near the remote location from which the vehicle may refill. Such situations may be even more vulnerable to fuel tampering yet harder to monitor.

There is therefore a need for a method and system to improve the accuracy of the reporting of fuel consumption by a vehicle and to prevent tampering with fuel consumption reporting.

SUMMARY

In the discussion unless otherwise stated, adjectives such as "substantially" and "about" modifying a condition or relationship characteristic of a feature or features of an embodiment of the invention, are understood to mean that the condition or characteristic is defined to within tolerances that are acceptable for operation of the embodiment for an application for which it is intended. Unless otherwise indicated, the word "or" in the specification and claims is considered to be the inclusive "or" rather than the exclusive or, and indicates at least one of, or any combination of items it conjoins.

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to one aspect, a method is provided for reporting fuel consumption, the method comprising:
providing a vehicle having a fuel level monitor;
repeatedly measuring fuel consumption by the vehicle with the monitor;
providing a server operable to generate fuel consumption reports, and
transmitting the fuel consumption measurements via a communication channel between the fuel level monitor and the server.

In some preferred embodiments the method further comprises securely storing the repeated fuel consumption measurements.

In some embodiments the communication channel is remote from the vehicle;
the method further comprising:
providing a removable memory device;
storing the repeated fuel consumption measurements on the removable memory device;
securely connecting the removable memory device to the remote communication channel; and
transferring fuel consumption measurements from the memory device to the server via the communication channel.

In some embodiments the method further comprises:
affixing a transmitter of a first signal to the vehicle;
repeatedly transmitting the first signal into a fuel tank of the vehicle,
affixing a sensor of a second signal to the vehicle,
the sensor repeatedly receiving a second signal from the fuel tank;
calculating fuel consumption data by the vehicle over a first period of time from a change in the received second signal over the first period of time;
storing the calculated fuel consumption data in the memory device over the first period of time;
verifying whether there is a wireless connection between the memory device and a server;
sending the calculated fuel consumption from the memory device to the server if there is a wireless connection, and
generating a report of the fuel consumption comprising the calculated fuel consumption.

In some embodiments the method further comprises tamper proofing the reporting by performing one or more of the following:
retaining on the server a reference frequency of the second signal; comparing the reference frequency to a measured frequency of the second signal measured over the first period of time, and
generating a tamper-alert if the reference frequency substantially differs from the measured frequency;
securely storing a first memory device identifier on the server;
reading from the memory device a second memory device identifier;
sending the second memory device identifier, along with the calculated fuel consumption data, to the server;
comparing the second memory device identifier to the first memory device identifier, and
generating a tamper-alert if the second memory device identifier and the first memory device identifier are not identical.

In some embodiments the method further comprises:
providing the vehicle with OBD (On Board Diagnostics);

verifying whether there is a wireless connection between the OBD and the server;

sending calculated fuel consumption from the OBD to the server if there is a wireless connection;

generating a report of the fuel consumption, and tamper proofing the reporting by performing:

retaining on the server a reference frequency of the second signal; comparing the reference frequency to a measured frequency of the second signal measured over the first period of time, and generating a tamper-alert if the reference frequency substantially differs from the measured frequency.

In some embodiments the method further comprises: sending a geolocation of the vehicle to the server, and reporting the geolocation in association with reporting the fuel consumption.

In some embodiments the first signal and second signal are ultrasonic;

the method further comprising modulating the first signal to reflect from a surface of fuel in the fuel tank;

wherein:

the second signal is a reflected signal from the surface;

the amplitude of the second signal is proportional to the level of the fuel in the fuel tank;

the fuel tank has known dimensions, and the fuel consumption is calculated from the known dimensions and the amplitude of the second signal.

In some embodiments the method further comprises providing communication modules, and transmitting the data from the memory device and\or the sensor via the communication modules to the server.

In some preferred embodiments the method further comprises further comprising tamper proofing:

securely storing a first communication module identifier on the server;

reading from the communication modules a second communication module identifier; sending the second communication module identifier, along with the calculated fuel consumption data, to the server;

comparing the second communication module identifier to the first communication module identifier, and generating a tamper-alert if the second communication module identifier and the first communication module identifier are not identical.

In some embodiments the method further comprises measuring the fuel consumption at predetermined but irregular intervals.

In some preferred embodiments the fuel consumption measuring is at intervals of between 1.5 and 2.5 minutes.

In some embodiments the method further comprises calculating an expected fuel consumption from the measured geolocations; comparing the expected fuel consumption to the calculated fuel consumption data, and generating an alert when a significant discrepancy is calculated between the expected fuel consumption to the calculated fuel consumption data.

According to another aspect, a system is provided that is configured to allow the fuel consumption reporting according to any one of the methods defined above.

In some embodiments the system further comprises a cloud based device capable of receiving the reports and calculating refunds.

In some embodiments the system is configured to allow any of the fuel consumption reportings defined above.

BRIEF DESCRIPTION OF FIGURES

The block diagram of FIG. 2 schematically represents a system for reporting consumption rate of fuel from a fuel tank as described herein.

DETAILED DESCRIPTION

The present invention generally relates to measuring fluid level and, more particularly, to a system and method for repeatedly measuring a fuel level in a vehicle, heavy duty equipment or an external fuel storage tank, and reporting the fuel level measurements. The system may store the fuel level measurement values in an internal memory and/or send them to an external server for future reference as required. Accordingly, fuel consumption may be monitored for excise movement and control systems.

According to one aspect, a fuel measurement system is provided comprising: at least one fuel level monitor; a server operable to generate fuel consumption reports, and a communication channel between the fuel level monitor and the server.

Some vehicles comprise On Board Diagnostics systems (OBD). OBD systems typically include a fuel level monitor. In some embodiments the OBD further includes at least part of the communication channel as either an add-on to the original OBD or as part of the original OBD.

Other vehicles do not comprise OBD systems. For such vehicles a fuel level monitor and optionally at least part of the communication channel may be retrofitted to and/or installed in the vehicle. For example, the fuel level monitor may include an emitter of a first signal that sends the first signal towards a fuel tank in the vehicle and a sensor of a second signal. The second signal results from an interaction of the first signal with the fuel tank, and the fuel contained therein.

For example, the emitter may be an ultrasonic emitter operable to emit an ultrasonic signal directed towards the fuel contained within the fuel tank. Accordingly, the sensor may be an ultrasonic sensor operable to detect the reflected signal from the surface of the fuel contained within the fuel tank such that a comparison of the emitted and detected signals indicates the level of the fuel.

Differences between consecutive measurements of the fuel level may be logged to indicate fuel consumption between those consecutive measurements. These measurements may be collected to produce a record of the ongoing fuel consumption by the vehicle. The record may be generated locally and uploaded to a remote server. Alternatively, individual measurements may be uploaded to the remote server and the remote server may generate the ongoing record, as required.

According to another aspect, the fuel monitoring of a vehicle in a movement and control system may include providing a vehicle with a fuel level monitor;

using the fuel level monitor to measure the fuel consumption of the vehicle; providing a server operable to generate fuel consumption reports, and transmitting fuel consumption measurements from the fuel level monitor to the server. The transmission is typically via a communication channel.

It is noted that the communication channel may not always be available for data or signal transmission, especially if the vehicle is sometimes in remote locations.

Accordingly, embodiments of the fuel measurement system may comprise a local memory device that is configured to allow storage of the monitored fuel consumption measurements. In some embodiments the communication channel may itself be remote from the vehicle, for example when the vehicle is confined to a remote location. In such embodiments the memory device may be connectable to the remote communication channel, so that the data may be uploaded when convenient to do so.

Optionally, a removable memory device may be provided which may be removed and connected to a communication channel, to allow periodic transfer of the fuel consumption measurements via the communication channel. Alternatively again, a removable memory device maybe connected directly to a remote server to upload data such as fuel consumption records and measurements directly thereto.

According to one aspect, when the fuel consumption is monitored for excise movement and control systems, an important feature of the monitoring may be to ensure that the monitoring is secure from the threat of data tampering.

Figure 1:
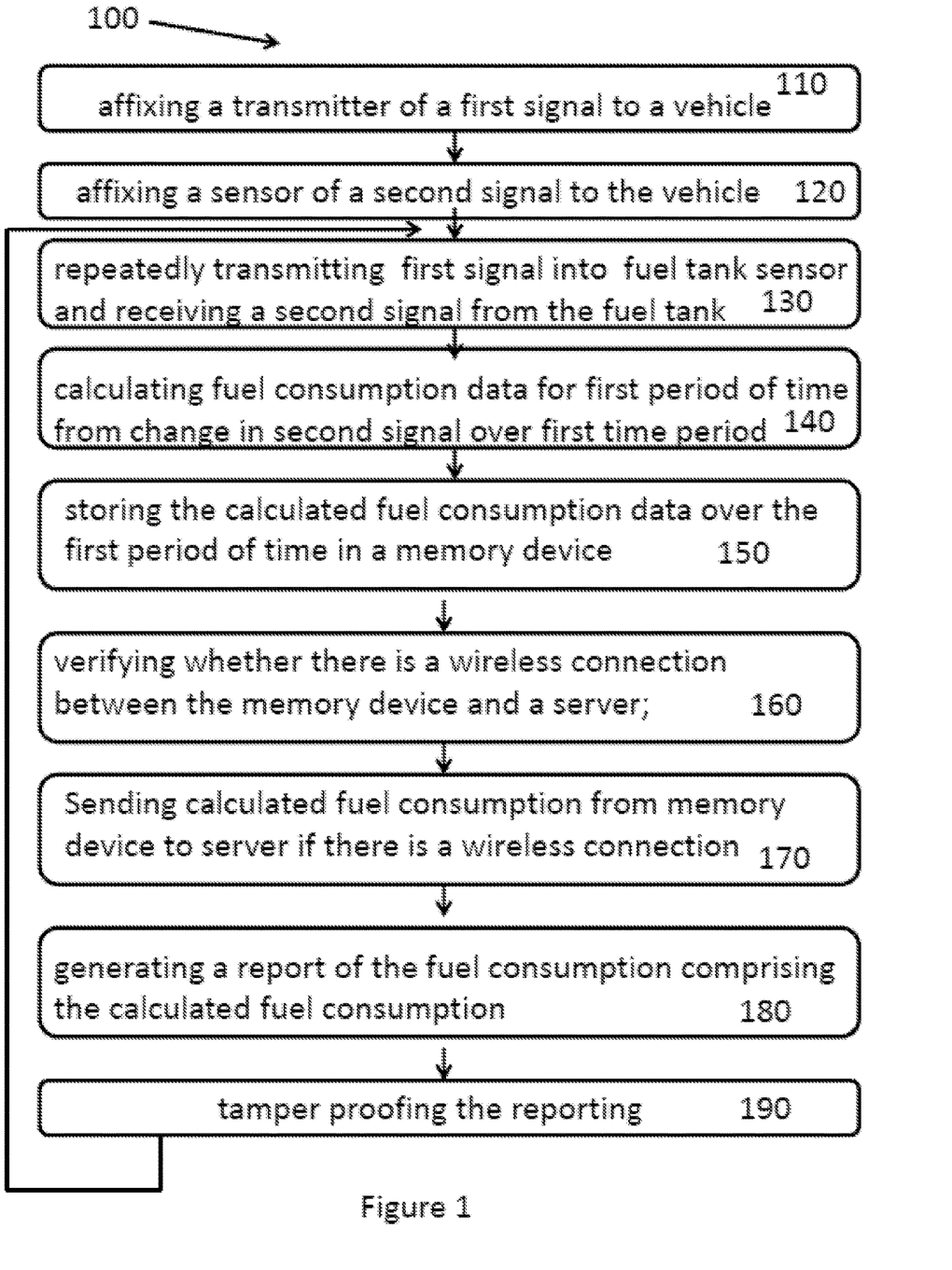
FIG. 1 presents a flowchart outlined selected steps of a method for reporting fuel consumption in a vehicle according to one aspect, a method mainly for a car not having OBD (On Board Diagnostics).

FIG. 1 depicts possible steps of a method 100 for securely reporting fuel consumption by a vehicle, according to some embodiments. The method comprises:
- 110 affixing an emitter of a first signal to the vehicle;
- 120 affixing a sensor of a second signal to the vehicle,
- 130 the emitter repeatedly emitting the first signal into a fuel tank of the vehicle, wherein the fuel tank contains fuel, and the sensor repeatedly receiving a second signal from the fuel tank;
- 140 calculating fuel consumption data by the vehicle over a first period of time from a change in the received second signal over the first period of time;
- 150 storing the calculated fuel consumption data over the first period of time in a memory device;
- 160 verifying whether there is a wireless connection between the memory device and a server;
- 170 sending the calculated fuel consumption from the memory device to the server if there is a wireless connection;
- 180 generating a report of the fuel consumption comprising the calculated fuel consumption, and
- 190 tamper proofing the reporting.

Various methods of tamper proofing may be used as required. In particular, the performing of one or more of the following are considered:
a) retaining on the server a reference frequency of the second signal; comparing the reference frequency to a measured frequency of the second signal measured over the first period of time, and reporting a tamper if the reference frequency substantially differs from the measured frequency;
b) securely storing a first memory device identifier on the server;
reading from the memory device a second memory device identifier;
sending the second memory device identifier, along with the calculated fuel consumption data, to the server;
comparing the second memory device identifier to the first memory device identifier, and
reporting a tamper if the second memory device identifier and the first memory device identifier are not identical.

In preferred embodiments the storing on the memory device may be secured against tampering, i.e. the fuel consumption measurements are protected from unauthorized alteration and/or access. For example, in some embodiments the measurements may be stored on a ROM (Read Only Memory).

Referring back to FIG. 1, steps 110 and 120 may be performed during a set-up phase of a reporting system. Such a set-up phase may precede a monitoring phase during which fuel consumption measurements are generated and reported. The set-up phase may not require repeating unless a tamper is reported. Nevertheless, in some embodiments, periodic inspections of the system may be recommended.

Steps 130 to 190 may be repeated periodically. Thus a first fuel consumption measurement may be collected following a first period of time, and a second fuel consumption measurement may be collected following a second period of time, and so forth.

Data from each fuel consumption measurement following each period of time may be retained on the memory device at least until after being transmitted to the server. Where required, the fuel consumption data may be deleted from the memory device once the fuel consumption data has been transferred to the server. Optionally, in some embodiments, later data from subsequent fuel consumption measurements obtained since the last transmission to the server may overwrite earlier data. In other embodiments, the earlier data is retained at least until actively removed, possibly only by authorized administrators with the requisite permissions. In some embodiments earlier data is retained until after the earlier data is inspected and confirmed to be free of tamper and/or corruption. In some embodiments an alert may be issued to indicate that later data is being transmitted and/or inspected and/or confirmed and/or erased from the memory device. The system may be designed such that a unique alert is issued indicating each action or state. In some embodiments the system is disabled until the later data is confirmed.

In some embodiments the emitter and sensor are affixed directly to the fuel tank.

For example, the emitter and sensor may be affixed with an epoxy glue. It is noted that in some embodiments, the glue may be selected to have characteristics such as being rigid and the like so as to ensure efficient transmission of ultrasound.

According to various embodiments, the record of the ongoing fuel consumption by the vehicle may be generated either locally or remotely as required. In order to enable remote generation of fuel consumption records, raw sensor signal data may be sent to a remote server and then the server may calculate fuel consumption by the vehicle.

Periodic fuel level measurements may be gathered at regular intervals. It is noted that regular periodic fuel level measurements may be a strong deterrent and/or impediment to attempts at system tampering. For example a sampling rate of one measurement every 1-3 minutes may be preferred or perhaps between 1.5-2.5 minutes. In still other embodiments, predetermined but irregular intervals between measured may be used, which may be particularly difficult to mimic by tamperers.

It is noted that where the system suffers a malfunction, the malfunction may mistakenly appear as a tamper to the system. Accordingly, embodiments the system may include a malfunction filter operable to distinguish between benign anomalies in reporting which are caused by malfunctions and to malign anomalies which are caused by tampering. For example, replacement of an emitter may be indicated by a characteristic change in the frequency of the second signal. This change in frequency may be distinguished from changes in the signal as a result of loose attachment of the emitter and/or sensor to the fuel tank, for example.

According to another aspect, a method is provided for reporting fuel consumption by a vehicle with an onboard diagnostics systems (OBD), the method includes:

providing a server operable to generate fuel consumption reports;

providing a communication channel between the OBD and the server;

verifying whether the channel has a wireless connection;

sending calculated fuel consumption from the OBD to the server if there is a wireless connection;

generating a report of the fuel consumption, and tamper proofing the reporting by performing one or more of the following:

a) retaining on the server a reference frequency of the second signal; comparing the reference frequency to a measured frequency of the second signal measured over the first period of time, and reporting a tamper if the reference frequency substantially differs from the measured frequency;

b) securely storing an original identifier on the server; reading from the OBD a contemporary identifier;

sending the contemporary identifier, along with the calculated fuel consumption data, to the server;

comparing the contemporary identifier to the original identifier, and reporting a tamper if the contemporary identifier and the original identifier are not identical.

A high consumption of fuel can be associated with a high mileage. Therefore, a further indication of tampering may be provided by tracking the location of the vehicle. The location tracking may be used to calculate an expected fuel consumption which may then be compared to a reported fuel consumption to serve as a check value to validate the fuel consumption report. Accordingly, where appropriate, in some embodiments the method further comprises a location tracking report along with fuel measurement report. For example the geolocation of the vehicle may be sent to the server at the first period of time, together with the report comprising the geolocation in association with the fuel consumption. An alert may be generated when a significant discrepancy is calculated between the expected fuel consumption to the calculated fuel consumption data, for example a discrepancy of over 20%.

As mentioned above, the first signal and second signal may be ultrasonic. In some embodiments the first signal may be modulated to reflect from the surface of fuel in the fuel tank; the second signal may be a reflected signal from the surface; and the amplitude of the second signal may be proportional to the level of the fuel in the fuel tank. In other embodiments the level of the fluid is proportional to the time lapse between the emission of the first signal and the receipt of the second signal.

Where the fuel tank has known dimensions (such as height, widths, and length as well as their variations with respect to each other), the fuel surface may be used to indicate volume contained therewithin. It is noted that the tilt angle of the vehicle may also be considered in order to calculate the fuel volume. The fuel consumption may then be calculated from the known dimensions and the amplitude of the second signal or the time lapse between emission and detection of the signal as discussed above.

At present I believe that this embodiment operates most efficiently, but the other embodiments are also satisfactory.

The memory device may comprise a memory module for storing measured data and may further include a microcontroller for computing the data. Alternatively, where the memory device does not comprise a microcontroller, the raw data may be uploaded to and processed by the server.

Typically the memory device, as well as the emitter, and optionally the sensor as well, are provided with electrical power by a battery. The battery may be backed up or rechargeable by a "direct" power supply, e.g. the vehicle's battery.

The system may further comprise communication modules, e.g. RF modules, for data transmission from the memory device and\or the sensor to the server. The server may receive logged or streamed data from the wireless communication modules.

The wireless communication modules may comprise unique identifiers. In some embodiments the method further comprises securely storing a first module identifier on the server; reading from the communication modules a second module identifier; sending the second module identifier, along with the calculated fuel consumption data, to the server; comparing the second module identifier to the first module identifier, and reporting a tamper if the second module identifier and the first module identifier are not identical.

Although the claims are directed to a vehicle, the invention may applied mutatis mutandis to big fuel storage tanks, to oil tanks and other fluid containers which have content that needs continuous and frequent monitoring. The report may serve for refund of excise tax paid on diesel fuel for example.

Some embodiments further comprise a cloud based device capable of receiving the reports and calculating refunds.

For best results, the system is first tested before use for a strong, measurable and stable signal. The test should be carried out when the vehicle is on a flat and even surface. Before affixing the emitter and sensor, they can be temporarily attached to the fuel tank with sticky tape etc. It is important to maintain a medium between the emitter/sensor and the tank during measurements, such as spreading a layer of ultrasound-transmitting gel commonly used in ultrasound tests.

In various embodiments of the disclosure, one or more tasks as described herein may be performed by a data processor, such as a computing platform or distributed computing system, for executing a plurality of instructions. Optionally, the data processor includes or accesses a volatile memory for storing instructions, data or the like. Additionally or alternatively, the data processor may access a non-volatile storage, for example, a magnetic hard-disk, flash-drive, removable media or the like, for storing instructions and/or data.

It is particularly noted that the systems and methods of the disclosure herein may not be limited in its application to the details of construction and the arrangement of the components or methods set forth in the description or illustrated in the drawings and examples. The systems and methods of the disclosure may be capable of other embodiments, or of being practiced and carried out in various ways and technologies.

Alternative methods and materials similar or equivalent to those described herein may be used in the practice or for testing embodiments of the disclosure. Nevertheless, particular methods and materials are described herein for illustrative purposes only. The materials, methods, and examples are not intended to be necessarily limiting.

The platform, methods, systems and architecture described hereinafter, are made purely by way of example to better illustrate various aspects of the current disclosure.

Figure 2:
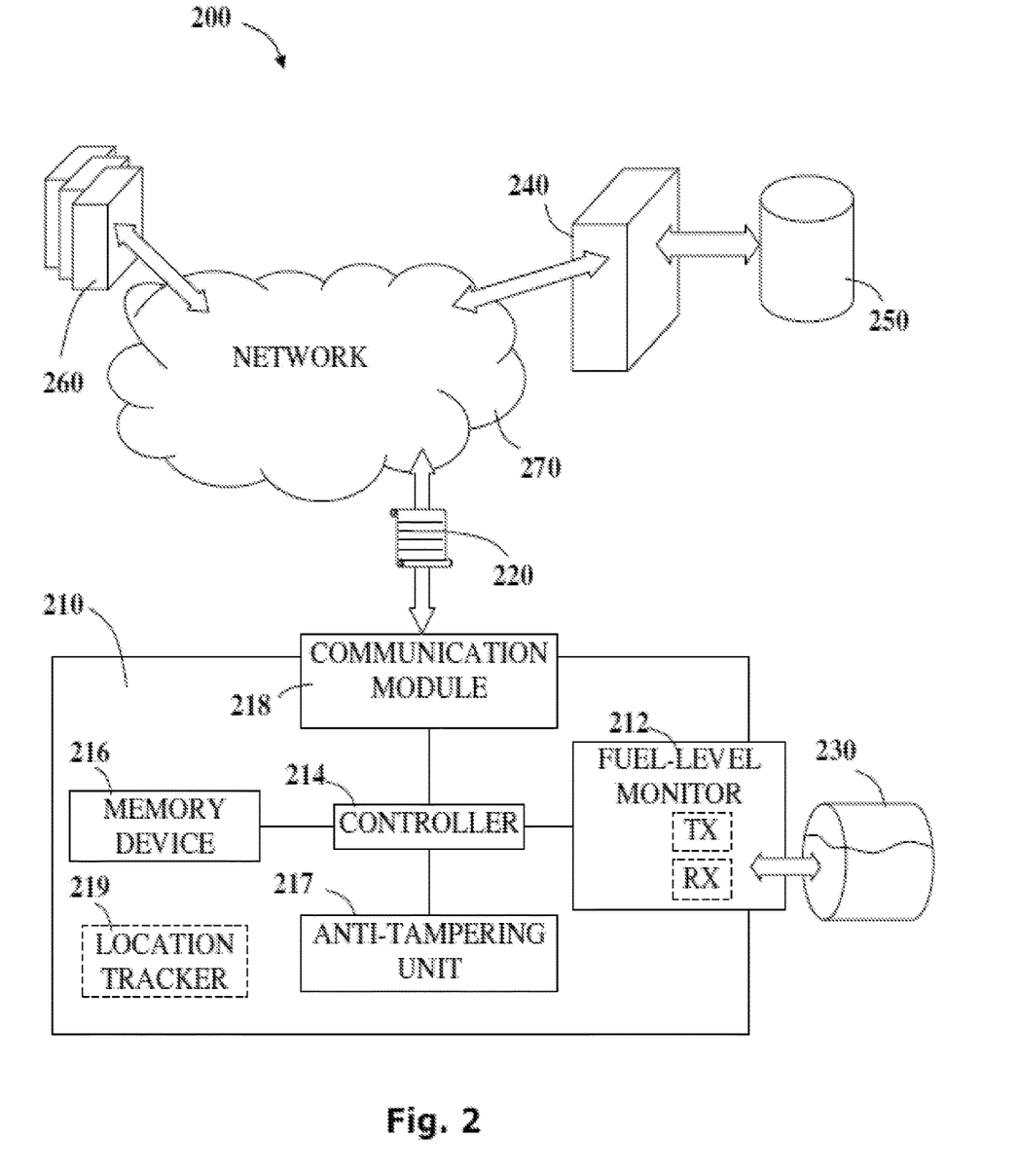

Reference is now made to the block diagram of FIG. 2 schematically representing a system 200 for reporting consumption rate of fuel from a fuel tank 230 as described herein.

The system 200 includes a fuel-tank monitoring unit 210, a remote server 240 and a database 250 interconnected via a computer network 270 such as the world wide web. The fuel-tank monitoring unit 210 may be integral to the fuel tank 230 or mounted thereto so as to monitor ongoing fuel consumption therefrom The fuel-tank monitoring unit 210 includes a fuel-level monitor 212, a controller 214, a memory device 216, a communication module 218.

The fuel-level monitor 212 is configured and operable to measure the volume of fuel contained within the fuel tank 230. Fuel-level measurements may be communicated to the controller 214 which may store the measurements on the memory device 216 and when appropriate, communicated to the remote server 240 via the communication module 218.

The communication module 218 is operable to transmit fuel consumption data 220 to the remote server 240. Variously the fuel consumption data 220 may comprise raw data measurements directly from the fuel level monitor 212. Alternatively, the fuel consumption data 220, include processed data indicating calculated values of fuel consumption as described herein. The fuel consumption data 220 may be communicated as individual records or as record arrays as appropriate.

Optionally the fuel-tank monitoring module 210 may further include an anti-tampering unit 217 for authenticating fuel-level measurements. Various examples of the anti-tampering unit 217 may function by communicating characteristic fuel level signal frequencies, sampling rates, which may be compared with validated values stored in a database 250 in communication with the remote server 240, as described herein. Additionally or alternatively, the fuel-tank monitoring unit 210 may include a location tracker 219 which may provide geographical tracking which may enable measured fuel-consumption rates to be compared with calculated values.

In various embodiments, the system 200 may be operable to use fuel consumptions measurements to calculate tax rebates, fuel refunds and the like. Accordingly, the remote server 240 may harvest further data from secondary sources 260 for example data relating to tax-rates, fuel-usage and the like.

The scope of the disclosed subject matter is defined by the appended claims and includes both combinations and sub combinations of the various features described hereinabove as well as variations and modifications thereof, which would occur to persons skilled in the art upon reading the foregoing description.

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like are intended to include all such new technologies a priori.

As used herein the term "about" refers to at least ±10%.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

In the description and claims of the present application, each of the verbs, "comprise," "include" and "have" and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A method of reporting fuel consumption, the method comprising:
providing a vehicle having a fuel level monitor;
repeatedly measuring fuel consumption by the vehicle with the monitor;
providing a server operable to generate fuel consumption reports, and transmitting the fuel consumption measurements via a communication channel between the fuel level monitor and the server, wherein the communication channel is remote from the vehicle;
securely storing the repeated fuel consumption measurements;
providing a removable memory device;
storing the repeated fuel consumption measurements on the removable memory device;
securely connecting the removable memory device to the remote communication channel; and
transferring fuel consumption measurements from the memory device to the server via the communication channel;
affixing a transmitter of a first signal to the vehicle;
repeatedly transmitting the first signal into a fuel tank of the vehicle,
affixing a sensor of a second signal to the vehicle,
the sensor repeatedly receiving a second signal from the fuel tank;
calculating fuel consumption data by the vehicle over a first period of time from a change in the received second signal over the first period of time;
storing the calculated fuel consumption data in the memory device over the first period of time;
verifying whether there is a wireless connection between the memory device and a server;
sending the calculated fuel consumption from the memory device to the server if there is a wireless connection, and
generating a report of the fuel consumption comprising the calculated fuel consumption.

2. The method of claim 1, further comprising tamper proofing the reporting by performing one or more of the following:
retaining on the server a reference frequency of the second signal;
comparing the reference frequency to a measured frequency of the second signal measured over the first period of time, and
generating a tamper-alert if the reference frequency substantially differs from the measured frequency;
securely storing a first memory device identifier on the server;
reading from the memory device a second memory device identifier;
sending the second memory device identifier, along with the calculated fuel consumption data, to the server;
comparing the second memory device identifier to the first memory device identifier, and
generating a tamper-alert if the second memory device identifier and the first memory device identifier are not identical.

3. The method of claim 1, wherein the fuel consumption measurement is at predetermined but irregular intervals.

4. The method of claim 1, wherein the fuel consumption measurement is at intervals of between 1.5 and 2.5 minutes.

5. The method of claim 1, wherein:
the first signal and second signal are ultrasonic;
the method further comprising modulating the first signal to reflect from a surface of fuel in the fuel tank;
wherein:
the second signal is a reflected signal from the surface;
the amplitude of the second signal is proportional to the level of the fuel in the fuel tank;
the fuel tank has known dimensions, and
the fuel consumption is calculated from the known dimensions and the amplitude of the second signal.

6. A system configured to allow the fuel consumption reporting according to claim 5.

7. The method of claim 1, further comprising:
providing communication modules, and
transmitting the data from the memory device and\or the sensor via the communication modules to the server.

8. A system configured to allow the fuel consumption reporting according to claim 7.

9. A system configured to allow the fuel consumption reporting according to claim 1.

10. The system of claim 9, further comprising a cloud based device capable of receiving the reports and calculating refunds.

11. The method of claim 1, further comprising:
sending a geolocation of the vehicle to the server, and reporting the geolocation in association with reporting the fuel consumption.

12. The method of claim 11, further comprising:
calculating an expected fuel consumption from the sent geolocations;
comparing the expected fuel consumption to the calculated fuel consumption data, and generating an alert when a significant discrepancy is calculated between the expected fuel consumption to the calculated fuel consumption data.

13. A system configured to allow the fuel consumption reporting according to claim 11.

14. A method of reporting fuel consumption, the method comprising:
providing a vehicle having a fuel level monitor;
repeatedly measuring fuel consumption by the vehicle with the monitor;
providing a server operable to generate fuel consumption reports, and
transmitting the fuel consumption measurements via a communication channel between the fuel level monitor and the server, wherein the communication channel is remote from the vehicle;
securely storing the repeated fuel consumption measurements;
providing a removable memory device;
storing the repeated fuel consumption measurements on the removable memory device;
securely connecting the removable memory device to the remote communication channel; and
transferring fuel consumption measurements from the memory device to the server via the communication channel;

providing the vehicle with OBD (On Board Diagnostics);

verifying whether there is a wireless connection between the OBD and the server;

sending calculated fuel consumption from the OBD to the server if there is a wireless connection;

generating a report of the fuel consumption, and tamper proofing the reporting by performing;

retaining on the server a reference frequency of the second signal; comparing the reference frequency to a measured frequency of the second signal measured over the first period of time, and generating a tamper-alert if the reference frequency substantially differs from the measured frequency.

15. A method of reporting fuel consumption, the method comprising:

providing a vehicle having a fuel level monitor;

repeatedly measuring fuel consumption by the vehicle with the monitor;

providing a server operable to generate fuel consumption reports;

transmitting the fuel consumption measurements via a communication channel between the fuel level monitor and the server;

providing communication modules;

transmitting the data from the memory device and\or the sensor via the communication modules to the server, and tamper proofing:

securely storing a first communication module identifier on the server;

reading from the communication modules a second communication module identifier; sending the second communication module identifier, along with the calculated fuel consumption data, to the server;

comparing the second communication module identifier to the first communication module identifier, and generating a tamper-alert if the second communication module identifier and the first communication module identifier are not identical.

16. A system configured to allow the fuel consumption reporting according to claim 15.

* * * * *